USO10039985B2

(12) United States Patent
Shiratori

(10) Patent No.: US 10,039,985 B2
(45) Date of Patent: Aug. 7, 2018

(54) METHOD FOR CONTROLLING COMPUTER, RECORDING MEDIUM AND COMPUTER

(71) Applicant: GREE, Inc., Minato-ku, Tokyo (JP)

(72) Inventor: Takashi Shiratori, Minato-ku (JP)

(73) Assignee: GREE, INC., Minato-ku, Tokyo (JP)

( * ) Notice: Subject to any disclaimer, the term of this patent is extended or adjusted under 35 U.S.C. 154(b) by 753 days.

(21) Appl. No.: 14/498,588

(22) Filed: Sep. 26, 2014

(65) Prior Publication Data

US 2015/0094141 A1 Apr. 2, 2015

(30) Foreign Application Priority Data

Sep. 30, 2013 (JP) ................. 2013-205827

(51) Int. Cl.
A63F 13/55 (2014.01)
A63F 13/58 (2014.01)
(Continued)

(52) U.S. Cl.
CPC ............ *A63F 13/58* (2014.09); *A63F 13/795* (2014.09); *A63F 13/822* (2014.09); *A63F 13/60* (2014.09);
(Continued)

(58) Field of Classification Search
CPC ........ A63F 13/55; A63F 13/58; A63F 13/822; A63F 2300/65; A63F 2300/807
See application file for complete search history.

(56) References Cited

U.S. PATENT DOCUMENTS 5,947,821 A * 9/1999 Stone ........................ A63F 1/18
273/292
6,256,047 B1 * 7/2001 Isobe ...................... A63F 13/10
345/158
(Continued)

FOREIGN PATENT DOCUMENTS

JP 2000342855 A * 12/2000
JP 2005-34303 2/2005
(Continued)

OTHER PUBLICATIONS

"Monopoly PC Manual," Copyright 2002 Gamespy Industries, Ltd.*
(Continued)

*Primary Examiner* — Steven J Hylinski
(74) *Attorney, Agent, or Firm* — Oblon, McClelland, Maier & Neustadt, L.L.P.

(57) ABSTRACT

Provided is a method for controlling a computer and the like that cause players to effectively use possessed game contents in a game, and increase the attractiveness of the game. The computer includes a storage unit that stores one or more game contents possessed by a player and a game content group, the one or more game contents each having a parameter value, the game content group being composed by using at least one of the one or more game contents, and makes a game proceed based on an instruction from a player. The method includes the steps of modifying the parameter value of a common game content in the game content group possessed by the player and being the same type as the one or more game contents other than the game content group, and processing an event by using the game content group whose parameter value is modified.

13 Claims, 13 Drawing Sheets

(51) Int. Cl.
*A63F 13/795* (2014.01)
*A63F 13/822* (2014.01)
*A63F 13/69* (2014.01)
*A63F 13/60* (2014.01)

(52) U.S. Cl.
CPC ....... *A63F 13/69* (2014.09); *A63F 2300/6009* (2013.01); *A63F 2300/609* (2013.01); *A63F 2300/65* (2013.01); *A63F 2300/807* (2013.01)

(56) References Cited

U.S. PATENT DOCUMENTS

| | | | | |
|---|---|---|---|---|
| 6,306,033 | B1* | 10/2001 | Niwa | A63F 13/10 463/1 |
| 6,322,077 | B1* | 11/2001 | Braunlich | A63F 1/02 273/292 |
| 6,419,584 | B1* | 7/2002 | Sakamoto | A63F 13/005 463/43 |
| 7,452,268 | B2* | 11/2008 | Annunziata | A63F 13/56 463/1 |
| 8,708,790 | B2* | 4/2014 | Eddy | A63F 13/10 463/31 |
| 8,795,044 | B2* | 8/2014 | Kojo | A63F 13/12 463/1 |
| 8,821,235 | B2* | 9/2014 | Urakubo | A63F 13/00 463/31 |
| 9,498,719 | B2* | 11/2016 | Takeuchi | A63F 13/335 |
| 2002/0045470 | A1* | 4/2002 | Atsumi | A63F 13/10 463/1 |
| 2003/0190951 | A1* | 10/2003 | Matsumoto | A63F 13/10 463/30 |
| 2004/0266505 | A1* | 12/2004 | Keam | A63F 13/12 463/1 |
| 2005/0021159 | A1 | 1/2005 | Ogawa | |
| 2008/0200226 | A1 | 8/2008 | Ichimura | |
| 2012/0034981 | A1* | 2/2012 | Yamaguchi | A63F 13/795 463/42 |
| 2013/0254680 | A1* | 9/2013 | Buhr | A63F 13/12 715/753 |
| 2013/0260881 | A1* | 10/2013 | Nonaka | A63F 13/69 463/29 |
| 2013/0324266 | A1* | 12/2013 | Takagi | A63F 13/10 463/43 |
| 2013/0337919 | A1* | 12/2013 | Kojo | A63F 13/12 463/42 |
| 2014/0274409 | A1* | 9/2014 | Tinsman | G07F 17/3274 463/42 |
| 2015/0151202 | A1* | 6/2015 | Aonuma | A63F 13/35 463/42 |

FOREIGN PATENT DOCUMENTS

| | | |
|---|---|---|
| JP | 2008-142352 | 6/2008 |
| JP | 2013-180201 A | 9/2013 |

OTHER PUBLICATIONS

"Monopoly 2008" Source http://www.giantbomb.com/images/ 1300-1838292 Published Jul. 11, 2011.*
"Monopoly Instruction Booklet Super Nintendo," Copyright 1992 Parker Brothers.*
English translation of Office action dated Aug. 25, 2015 in corresponding JP 2015-130476, 3 pp.
"Quest of D player's guide", Softbank Publishing Inc., First edition, p. 013, including English translation 4 pp.
"Wartime card battle REKI-DAMA", Famitsu Gree vol. 2, ENTERBRAIN Inc., pp. 88-90, including English translation 7 pp.

* cited by examiner

FIG. 4A

| PLAYER | NAME | IMAGE | POSSESSED CARDS | DECK₁ | | ... | FRIEND |
|---|---|---|---|---|---|---|---|
| | | | | DECK CARD₁ | ... | ... | |
| P_001 | PLAYER₁ | p1.jpg | C_001,... | C_001 | ... | ... | P_002,... |
| P_002 | PLAYER₂ | p2.jpg | C_002,... | C_002 | ... | ... | P_001,... |
| ... | ... | ... | ... | ... | ... | ... | ... |

FIG. 4B

| CARD | TYPE | ADJUSTED PARAMETERS | | |
|---|---|---|---|---|
| | | ADJUSTED ATTACK POWER | ADJUSTED DEFENSE POWER | ... |
| C_001 | S_001 | 110 | 110 | ... |
| C_002 | S_001 | 105 | 105 | ... |
| ... | ... | ... | ... | ... |

FIG. 4C

| TYPE | NAME | IMAGE | PARAMETERS | | |
|---|---|---|---|---|---|
| | | | ATTACK POWER | DEFENSE POWER | ... |
| S_001 | CARD₁ | c1.jpg | 100 | 100 | ... |
| S_002 | CARD₂ | c2.jpg | 200 | 50 | ... |
| ... | ... | ... | ... | ... | ... |

FIG. 4D

| ENEMY CHARACTER | NAME | IMAGE | PARAMETERS | | |
|---|---|---|---|---|---|
| | | | ATTACK POWER | DEFENSE POWER | ... |
| E_001 | ENEMY CHAR₁ | e1.jpg | 500 | 500 | ... |
| E_002 | ENEMY CHAR₂ | e2.jpg | 1000 | 250 | ... |
| ... | ... | ... | ... | ... | ... |

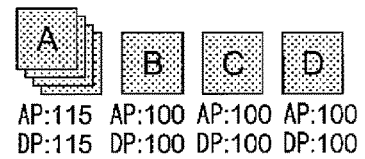
AP:115 AP:100 AP:100 AP:100
DP:115 DP:100 DP:100 DP:100
FIG. 8A
CARD A
AP:100×(1+0.05×3) = 115
DP:100×(1+0.05×3) = 115
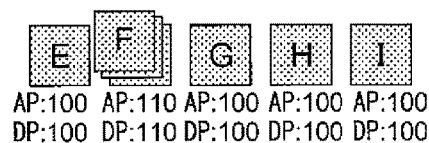
AP:100 AP:110 AP:100 AP:100 AP:100
DP:100 DP:110 DP:100 DP:100 DP:100
CARD F
AP:100×(1+0.05×2) = 110
DP:100×(1+0.05×2) = 110
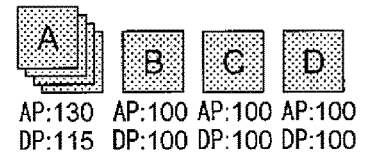
AP:130 AP:100 AP:100 AP:100
DP:115 DP:100 DP:100 DP:100
FIG. 8B
CARD A
AP:100×(1+0.10×3) = 130
DP:100×(1+0.05×3) = 115
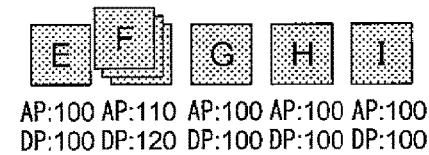
AP:100 AP:110 AP:100 AP:100 AP:100
DP:100 DP:120 DP:100 DP:100 DP:100
CARD F
AP:100×(1+0.05×2) = 110
DP:100×(1+0.10×2) = 120
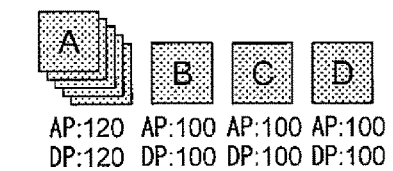
AP:120 AP:100 AP:100 AP:100
DP:120 DP:100 DP:100 DP:100
FIG. 8C
CARD A
AP:100×(1+0.05×4) = 120
DP:100×(1+0.05×4) = 120
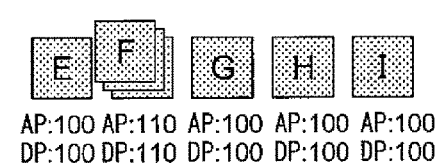
AP:100 AP:110 AP:100 AP:100 AP:100
DP:100 DP:110 DP:100 DP:100 DP:100
CARD F
AP:100×(1+0.05×2) = 110
DP:100×(1+0.05×2) = 110
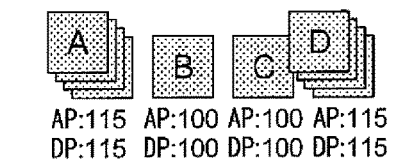
AP:115 AP:100 AP:100 AP:115
DP:115 DP:100 DP:100 DP:115
FIG. 8D
CARD A
AP:100×(1+0.05×3) = 115
DP:100×(1+0.05×3) = 115
CARD D
AP:100×(1+0.05×3) = 115
DP:100×(1+0.05×3) = 115
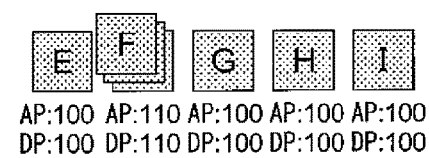
AP:100 AP:110 AP:100 AP:100 AP:100
DP:100 DP:110 DP:100 DP:100 DP:100
CARD F
AP:100×(1+0.05×2) = 110
DP:100×(1+0.05×2) = 110

FIG. 9A

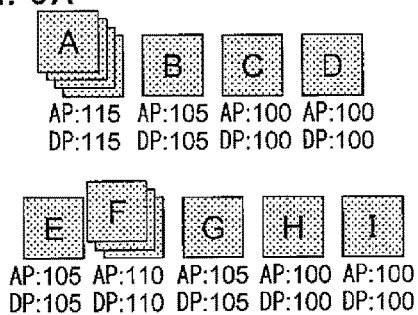

AP:115 AP:105 AP:100 AP:100
DP:115 DP:105 DP:100 DP:100

AP:105 AP:110 AP:105 AP:100 AP:100
DP:105 DP:110 DP:105 DP:100 DP:100

CARD B
AP:100×(1+0.05×1)=105
DP:100×(1+0.05×1)=105

CARD E
AP:100×(1+0.05×1)=105
DP:100×(1+0.05×1)=105

CARD G
AP:100×(1+0.05×1)=105
DP:100×(1+0.05×1)=105

FIG. 9B

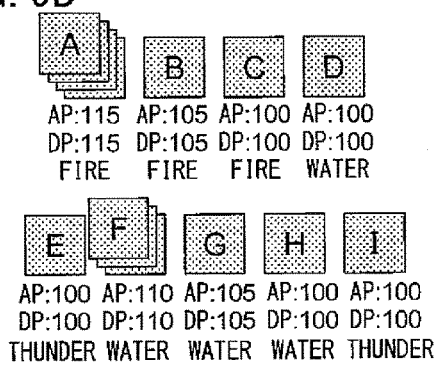

AP:115 AP:105 AP:100 AP:100
DP:115 DP:105 DP:100 DP:100
FIRE   FIRE   FIRE   WATER

AP:100 AP:110 AP:105 AP:100 AP:100
DP:100 DP:110 DP:105 DP:100 DP:100
THUNDER WATER WATER WATER THUNDER

CARD B
AP:100×(1+0.05×1)=105
DP:100×(1+0.05×1)=105

CARD G
AP:100×(1+0.05×1)=105
DP:100×(1+0.05×1)=105

FIG. 9C

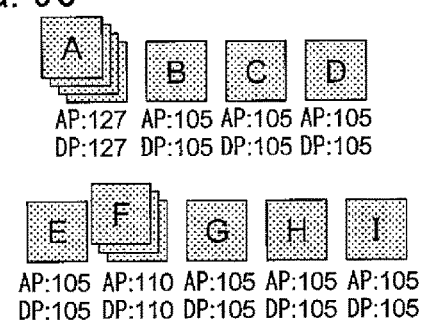

AP:127 AP:105 AP:105 AP:105
DP:127 DP:105 DP:105 DP:105

AP:105 AP:110 AP:105 AP:105 AP:105
DP:105 DP:110 DP:105 DP:105 DP:105

CARD A
AP:100×(1+0.05×3)×(1+0.05×2)=127
DP:100×(1+0.05×3)×(1+0.05×2)=127

CARD B
AP:100×(1+0.05×1)=105
DP:100×(1+0.05×1)=105

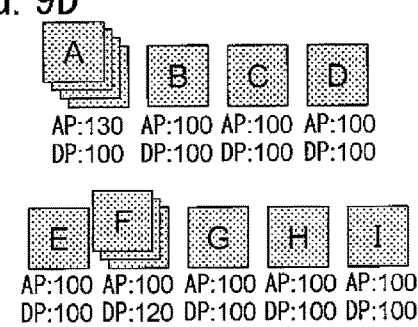

AP:130 AP:100 AP:100 AP:100
DP:100 DP:100 DP:100 DP:100

AP:100 AP:100 AP:100 AP:100 AP:100
DP:100 DP:120 DP:100 DP:100 DP:100

CARD A
AP:100×(1+0.10×3)=130
DP:100

CARD F
AP:100
DP:100×(1+0.10×2)=120

METHOD FOR CONTROLLING COMPUTER, RECORDING MEDIUM AND COMPUTER

CROSS REFERENCE TO RELATED APPLICATION

This application is a new U.S. patent application that claims benefit of JP 2013-205827, filed on Sep. 30, 2013. The entire content of JP 2013-205827 is hereby incorporated by reference.

TECHNICAL FIELD

This invention relates to a method for controlling a computer, a recording medium and a computer.

BACKGROUND

In recent years, a server which provides a game to portable devices via a communication network has been commonly used. The game provided by the server includes one in which multiple players can participate (i.e., a "social game"), in which the players can not only battle and cooperate with each other but also communicate with each other (for example, refer to Japanese Unexamined Patent Publication No. 2005-034303).

As an example of such a social game, a game is known in which a player battles against an enemy character by using, for example, cards (i.e., a "card battle game") (for example, refer to Japanese Unexamined Patent Publication No. 2008-142352). In a card battle game, by using cards, a player battles against an enemy character created by the game program, while cooperating with a different player. Each player can possess an arbitrary number of cards, and, by using at least one possessed card, forms a set of cards (i.e., a "deck") to be used for the battle. Each card has parameters such as attack power, defense power, and a health point, and the players reduce the health point value of the enemy character based on the attack power values of the cards which form the deck (hereinafter, referred to as "deck cards"). The enemy character also has parameters similarly to the cards, and, based on the attack power value thereof, reduces the health point values of the deck cards. The players and the enemy character alternately attack each other, and the battle ends when the health point value of the enemy character has fallen to 0, or when the health point value of each deck card has fallen to 0.

FIG. 12 illustrates an example of a battle screen 1000 of a conventional card battle game.

An image 1001 and a health point gauge 1002 of an enemy character are displayed at the top of the screen, while images 1003 and health point gauges 1004 of deck cards are displayed at the bottom of the screen. When a battle starts, proceeding of the battle is displayed in such a manner that the deck cards attack the enemy character one after another, and next, the enemy character attacks a part of the deck cards (for example, the deck cards indicated by a broken line 1005) all at once, and again, the deck cards attack the enemy character one after another. If the player provides an instruction to use a support character (not illustrated), the support character is displayed at the time when the enemy character attacks a part of the deck cards all at once, and then the support character attacked by the enemy character in place of the deck cards is displayed. Then, the battle ends when the health point gauge 1002 of the enemy character has fallen to 0, or when the health point gauges 1004 of the deck cards have fallen to 0, and the outcome of the battle is displayed.

SUMMARY

However, in conventional card battle games, the number of cards which can be set in the deck is limited, and thus, even if a player possesses more cards than the limit, these cards cannot be used. As a matter of course, it is possible to sell the possessed cards, or use them as a material for strengthening synthesis. However, players cannot easily sell cards which were acquired with difficulty or acquired by strengthening synthesis.

The present invention has been devised to overcome the above problem, and an object of the invention is to provide a method for controlling a computer, a recording medium and a computer that cause players to effectively use possessed game contents in a game, and increase the attractiveness of the game.

Provided is a method for controlling a computer including a storage unit configured to store one or more game contents possessed by a player and a game content group, the one or more game contents each having a parameter value, the game content group being composed by using at least one of the one or more game contents, the computer making a game proceed based on an instruction from a player. The method includes the steps of modifying the parameter value of a common game content in the game content group possessed by the player and being the same type as the one or more game contents other than the game content group, and processing an event by using the game content group whose parameter value is modified.

The computer may be, for example, a portable device, a desktop device, a server, and the like, as long as it can execute the above procedure.

Provided is a method for controlling a computer including a storage unit configured to store one or more game contents possessed by a player, a game content group, friend information of the player, and one or more game contents possessed by the friend, the one or more game contents each having a parameter value, the game content group being composed by using at least one of the one or more game contents possessed by the player, the computer making a game proceed based on an instruction from a player. The method includes the steps of modifying the parameter value of a common game content in the game content group possessed by the player and being the same type as the one or more game contents possessed by the friend, and processing an event by using the game content group whose parameter value is modified.

Preferably, in the step of modifying of the above method, the parameter value of the common game content is modified, on the basis of the number of game contents corresponding to the common game content among the one or more game contents other than game content group.

Preferably, in the step of modifying of the above method, the parameter value of the common game content is modified, on the basis of the parameter value of a game content corresponding to the common game content among the one or more game contents other than game content group.

Preferably, in the above method, the storage unit further stores positions at which the one or more game contents composing the game content group are placed, and the number of game contents which are referred to at the time of modifying has an upper limit, the game contents corresponding to the common game content among the one or more game contents other than game content group.

Preferably, in the above method, if the number of game contents corresponding to the common game content is larger than the upper limit, in the step of modifying, the parameter value of the common game content is modified, on the basis of a position at which the common game content is placed.

Preferably, in the above method, the storage unit further stores positions at which the one or more game contents composing the game content group are placed, and the method further includes the step of modifying the parameter value of a game content placed adjacent to the common game content.

Preferably, in the above method, each of the game contents further has an attribute, and in the step of modifying the parameter value of a game content placed adjacent to the common game content, the parameter value of a game content whose attribute coincides with that of the common game content is modified among game contents placed adjacent to the common game content.

Preferably, in the above method, the storage unit further stores an association between a player and a friend, and the number of game contents which are referred to at the time of modifying has an upper limit, the game contents corresponding to the common game content among the one or more game contents other than the game content group, and the method further includes the step of modifying the upper limit on the basis of the number of friends associated with the player.

Preferably, in the above method, the number of game contents which are referred to at the time of modifying has an upper limit, the game contents corresponding to the common game content among the one or more game contents other than game content group, and in the step of modifying, the parameter value of at least one game content in the game content group is modified on the basis of the number of common game contents for each of which the number of game contents corresponding to the common game content and being referred to has reached the upper limit.

Preferably, in the above method, the storage unit further stores a different game content possessed by the player and having a parameter value, and the number of game contents which are referred to at the time of modifying has an upper limit, the game contents corresponding to the common game content among the one or more game contents other than game content group. The method further includes the steps of modifying the parameter value of the different game content on the basis of the number of common game contents for each of which the number of game contents corresponding to the common game content and being referred to has reached the upper limit, and processing the event by using the different game content whose parameter value is modified.

Preferably, in the above method, the storage unit further stores positions at which the one or more game contents composing the game content group are placed, each of the game contents has at least two parameter values, and in the step of modifying, a parameter value corresponding to a position at which the common game content is placed among the parameter values of the common game content is modified.

Preferably, the above method further includes the step of displaying the common game content in a different manner from another game content in the game content group.

Preferably, the above method further includes the step of displaying the number of the one or more game contents other than the game content group possessed by the player, the number of the one or more game contents possessed by the friend, or both of the number of the one or more game contents other than the game content group possessed by the player and the number of the one or more game contents possessed by the friend.

Provided is a non-transitory computer-readable recording medium having recorded thereon a program for a computer including a storage unit configured to store one or more game contents possessed by a player and a game content group, the one or more game contents each having a parameter value, the game content group being composed by using at least one of the one or more game contents, the computer making a game proceed based on an instruction from a player. The program causes the computer to execute the above method.

Provided is a non-transitory computer-readable recording medium having recorded thereon a program for a computer including a storage unit configured to store one or more game contents possessed by a player, a game content group, friend information of the player, and one or more game contents possessed by the friend, the one or more game contents each having a parameter value, the game content group being composed by using at least one of the one or more game contents possessed by the player, the computer making a game proceed based on an instruction from a player. The program causes the computer to execute the above method.

Provided is a computer for making a game proceed based on an instruction from a player, which includes a storage unit configured to store one or more game contents possessed by a player and a game content group, the one or more game contents each having a parameter value, the game content group being composed by using at least one of the one or more game contents, and a processing unit configured to modify the parameter value of a common game content in the game content group possessed by the player and being the same type as the one or more game contents other than the game content group, and process an event by using the game content group whose parameter value is modified.

Provided is a computer for making a game proceed based on an instruction from a player, which includes a storage unit configured to store one or more game contents possessed by a player, a game content group, friend information of the player, and one or more game contents possessed by the friend, the one or more game contents each having a parameter value, the game content group being composed by using at least one of the one or more game contents possessed by the player, and a processing unit configured to modify the parameter value of a common game content in the game content group possessed by the player and being the same type as the one or more game contents possessed by the friend, and process an event by using the game content group whose parameter value is modified.

The above method, recording medium and computer make it possible to cause players to effectively use possessed game contents in a game, and to increase the attractiveness of the game. Therefore, it is possible to maintain and increase the players' wish to continue the service, and to maintain their interests in the game.

BRIEF DESCRIPTION OF THE DRAWINGS

Other features and advantages of the present invention will be apparent from the ensuing description, taken in conjunction with the accompanying drawings, in which:

FIGS. 4A to 4D illustrate examples of data structures of the various types of tables;

FIGS. 8A to 8D illustrate other examples of the method for adjusting parameters;

FIGS. 9A to 9D illustrate still other examples of the method for adjusting parameters;

DESCRIPTION

Hereinafter, with reference to the drawings, a method for controlling a computer, a recording medium, and a computer will be described. It should be noted that the technical scope of the present invention is not limited to embodiments of the invention, but covers the invention described in the claims and its equivalent.

In the present embodiment, a player battles against an enemy character by using cards which are an example of game contents. The player can possess an arbitrary number of cards, and forms a deck by using at least one possessed card in advance. Each deck card has parameters such as attack power, defense power, and a health point. These values are adjusted on the basis of the possessed cards other than the deck cards, and the like. The player battles against an enemy character by using the deck cards whose parameter values are adjusted.

Game contents refer to digital contents used in a game, and include, for example, cards, figures, avatars, items, and the like. Parameter of a card include, for example, attack power, defense power, a health point (or HP (hit point)), an attribute (for example, fire, water, thunder, and the like), a rarity value (for example, normal, rare, S (super) rare, SS (double super) rare, SSS (triple super) rare, legend, and the like), an activation rate of a skill (special effect), the number of attack per turn, the number of defense per battle, and the like.

Figure 1:
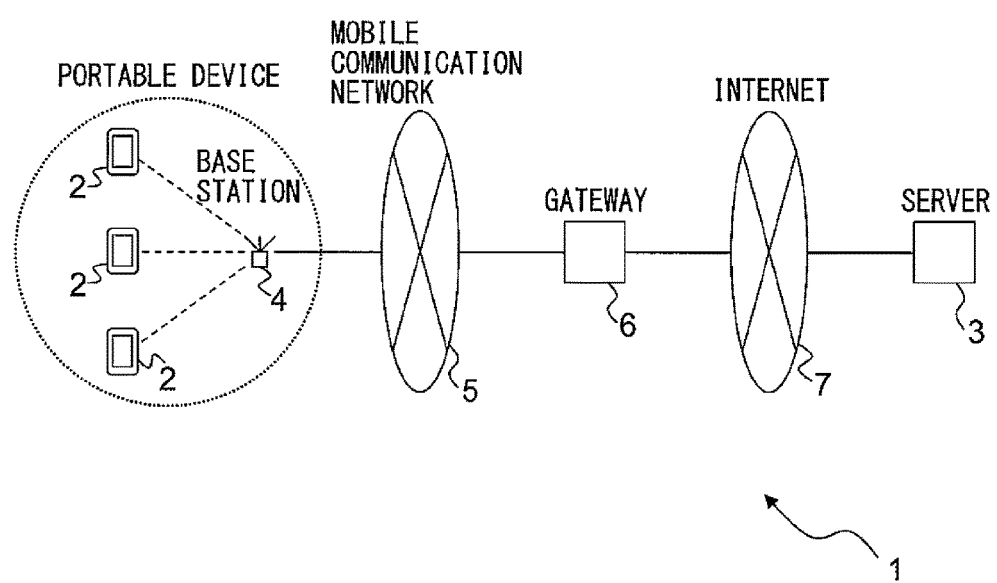
FIG. 1 illustrates an example of a schematic configuration of a game system.

FIG. 1 illustrates an example of a schematic configuration of a game system 1.

The game system 1 includes at least one portable device 2 and a server 3. The portable device 2 and the server 3 are connected to each other via a communication network, and are connected to each other, for example, via a base station 4, a mobile communication network 5, a gateway 6, and the Internet 7. A program to be executed by the portable device 2 (for example, a browsing program) and a program to be executed by the server 3 (for example, a game program) communicate with each other by using a communication protocol such as a Hypertext Transfer Protocol (HTTP).

Figure 2:
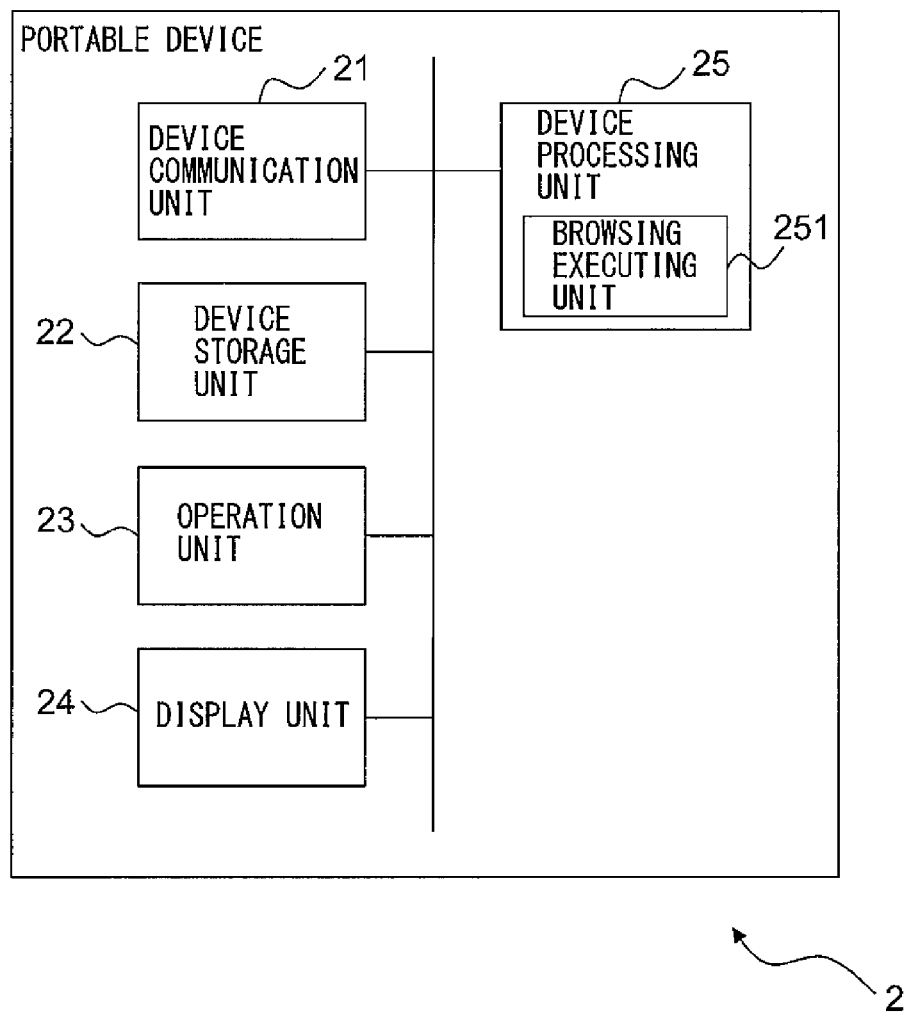
FIG. 2 illustrates an example of a schematic configuration of the portable device.

FIG. 2 illustrates an example of a schematic configuration of the portable device 2.

The portable device 2 is connected to the server 3 via the base station 4, the mobile communication network 5, the gateway 6, and the Internet 7, to communicate with the server 3. The portable device 2 requests the progress of a game of the server 3 in response to an operation of an operation unit 23 (for example, a button) by a player. The portable device 2 receives display data relating to the progress of the game from the server 3, and displays the received display data. In order to implement the foregoing functions, the portable device 2 includes a device communication unit 21, a device storage unit 22, the operation unit 23, a display unit 24, and a device processing unit 25.

While a multifunctional mobile phone (a so-called "smartphone") may be assumed as the portable device 2, the present invention is not limited to this. The portable device 2 may be, for example, a mobile phone (a so-called "feature phone"), a personal digital assistant (PDA), a portable game machine, a portable music player, a tablet device, a tablet personal computer (PC), a notebook PC, and the like, as long as the present invention is applicable thereto.

The device communication unit 21 includes a communication interface circuit including an antenna having a sensitivity band in a predetermined frequency band, and connects the portable device 2 to a wireless communication network. The device communication unit 21 establishes a wireless signal link with the base station 4 by a Code Division Multiple Access (CDMA) system or the like via a channel to be assigned by the base station 4, and communicates with the base station 4. The device communication unit 21 sends data supplied from the device processing unit 25 to the server 3 or the like. The device communication unit 21 supplies the data received from the server 3 or the like to the device processing unit 25.

The device storage unit 22 includes a semiconductor memory, for example. The device storage unit 22 stores an operating system program, a driver program, an application program, data, and the like, used for processing in the device processing unit 25. For example, the device storage unit 22 stores an input device driver program for controlling the operation unit 23 and an output device driver program for controlling the display unit 24, as the driver program. The device storage unit 22 stores a program and the like for retrieving and displaying display data relating to the progress of the game, as the application program. The device storage unit 22 stores display data, video data, image data and the like relating to the progress of the game, as the data. Further, the device storage unit 22 may store temporary data relating to predetermined processing.

The operation unit 23 may be any device capable of operating the portable device 2, for example, a touch panel, a key button or the like. The player can input letters, numbers, symbols and the like by using the operation unit 23. When operated by the player, the operation unit 23 creates a signal corresponding to the operation. The created signal is supplied to the device processing unit 25 as an instruction from the player.

The display unit 24 may be any device capable of displaying a video, an image and the like, for example, a liquid crystal display, an organic electro-luminescence (EL) display or the like. The display unit 24 displays a video, an image and the like corresponding to video data and image data supplied from the device processing unit 25.

The device processing unit 25 includes one or more processors and their peripheral circuits. The device processing unit 25 is, for example, a central processing unit (CPU), and integrally controls an overall operation of the portable device 2. The device processing unit 25 controls operations of the device communication unit 21, the display unit 24, and the like so that various types of processing of the portable device 2 are executed in an appropriate order in accordance with the programs stored in the device storage unit 22, the operation of the operation unit 23, and the like. The device processing unit 25 executes processing based on the programs (the operating system program, the driver program, the application program and the like) stored in the device storage unit 22. The device processing unit 25 can execute multiple programs (application programs and the like) in parallel.

The device processing unit 25 includes at least a browsing executing unit 251. Each of the units is a functional module implemented by a program to be executed by the processor included in the device processing unit 25. Alternatively, each of the units may be provided as a firmware on the portable device 2.

The browsing executing unit 251 retrieves and displays display data relating to the progress of the game. In other words, the browsing executing unit 251 sends a request to retrieve the display data relating to the progress of the game to the server 3 via the device communication unit 21 in response to an instruction from the player. The browsing executing unit 251 receives corresponding display data from the server 3 via the device communication unit 21. The browsing executing unit 251 creates drawing data based on the received display data. In other words, the browsing executing unit 251 interprets the received display data to specify control data and content data, lays out the retrieved content data according to the retrieved control data, and creates the drawing data. Then, the browsing executing unit 251 outputs the created drawing data to the display unit 24.

Figure 3:
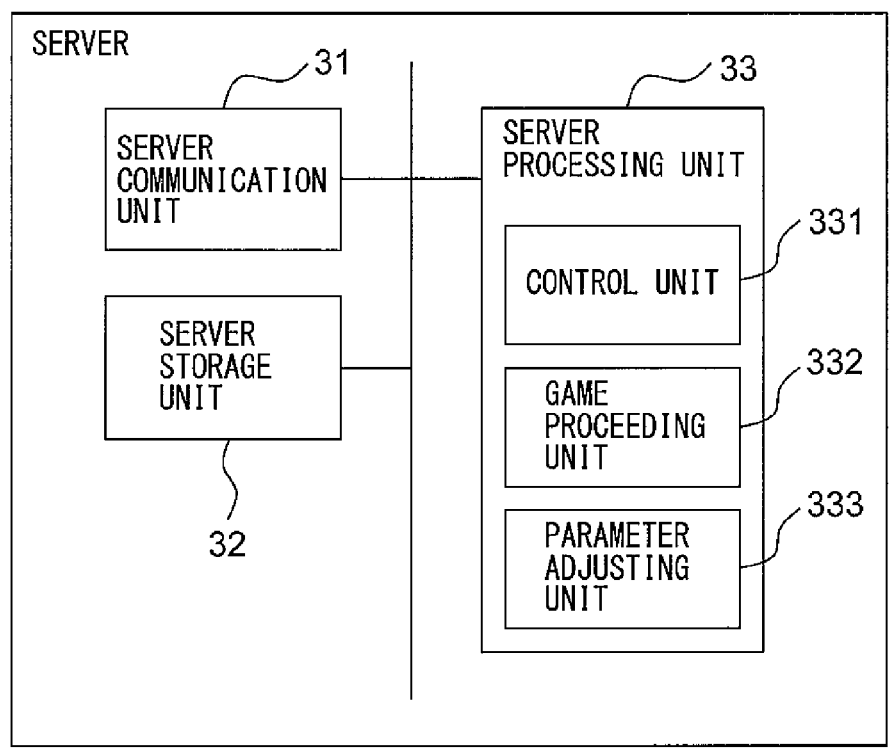
FIG. 3 illustrates an example of a schematic configuration of the server.

FIG. 3 illustrates an example of a schematic configuration of the server 3.

The server 3 makes the game proceed in response to a request from the portable device 2. The server 3 creates display data relating to the progress of the game, and sends the created display data to the portable device 2. In order to implement the foregoing functions, the server 3 includes a server communication unit 31, a server storage unit 32, and a server processing unit 33.

The server communication unit 31 includes a communication interface circuit for connecting the server 3 to the Internet 7, and communicates with the Internet 7. The server communication unit 31 supplies the data received from the portable device 2 or the like to the server processing unit 33. The server communication unit 31 sends the data supplied from the server processing unit 33 to the portable device 2 or the like.

The server storage unit 32 includes at least one of a magnetic tape device, a magnetic disk device and an optical disk device, for example. The server storage unit 32 stores an operating system program, a driver program, an application program, data, and the like, used for processing in the server processing unit 33. The server storage unit 32 stores, for example, a game program and the like for making the game proceed and creating display data relating to its result, as the application program. The server storage unit 32 stores, as the data, a player table (FIG. 4A) for managing players, a card table (FIG. 4B) for managing cards, a card-type table (FIG. 4C) for managing types of cards, an enemy table (FIG. 4D) for managing enemy characters, and image data and the like of the players, cards, and enemy characters. Further, the server storage unit 32 may store temporary data relating to certain processing.

FIGS. 4A to 4D illustrate examples of data structures of the various types of tables.

FIG. 4A illustrates the player table. The player table stores, for each player, an identification number (ID) and name of the player, a file name of image data, IDs of possessed cards, IDs of the deck cards for each deck, an ID of a different player who is in a friend status with the player, and the like.

FIG. 4B illustrates the card table. The card table stores, for each card, an ID of the card, a type ID, adjusted parameters such as adjusted attack power, adjusted defense power and an adjusted health point, and the like.

FIG. 4C illustrates the card-type table. The card-type table stores, for each card type, an ID and name of the type, a file name of image data, parameters such as attack power, defense power and a health point, and the like.

In the present embodiment, it is assumed that cards which have different names are of different types (have different IDs). However, the present invention is not limited to this. The types of cards are not limited to any particular ones, as long as the present invention is applicable thereto. For example, cards which have different rarity values may be belong to different types even if the cards have the same name.

FIG. 4D illustrates the enemy character table. The enemy character table stores, for each enemy character, an ID and name of the enemy character, a file name of image data, parameters such as attack power, defense power and a health point, and the like.

The server processing unit 33 includes one or more processors and their peripheral circuits. The server processing unit 33 is, for example, a CPU, and integrally controls an overall operation of the server 3. The server processing unit 33 controls an operation of the server communication unit 31 or the like so that various types of processing of the server 3 are executed in an appropriate order in accordance with the programs stored in the server storage unit 32. The server processing unit 33 executes processing based on the programs stored in the server storage unit 32 (the operating system program, the driver program, the application program and the like). The server processing unit 33 can execute the multiple programs (the application program and the like) in parallel.

FIGS. 5A to 6D illustrate examples of display screens of the portable device 2 based on display data created by the server 3.

Figure 5A:
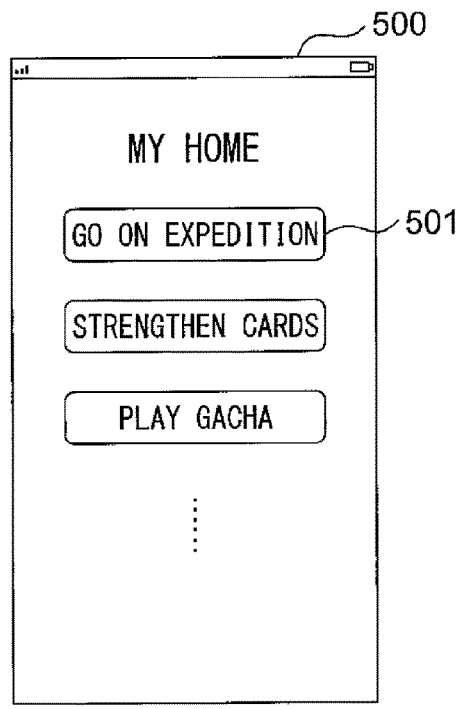
FIGS. 5A to 5D illustrate examples of display screens of the portable device.

FIG. 5A depicts a home screen 500 which is displayed when the game is started. The home screen 500 is displayed on the basis of home screen display data received from the server 3.

In the center of the screen, plural buttons are listed. When a "Go on expedition" button 501 is pressed, the proceeding of the game is requested to the server 3 via the device communication unit 21 by using the ID of the player as a parameter.

Figure 5B:
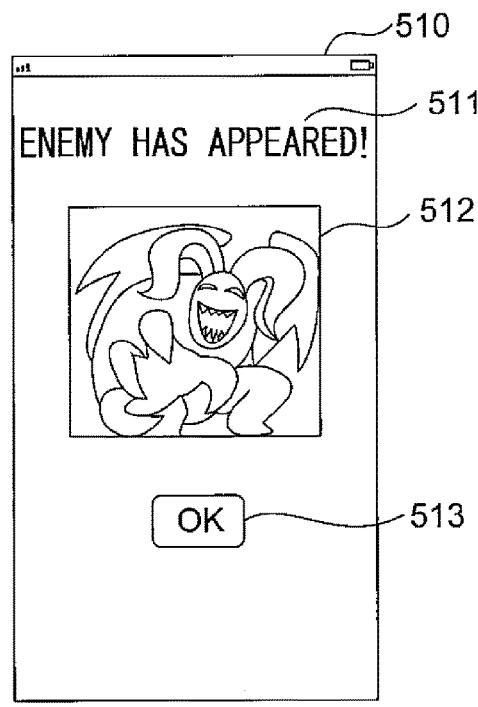

FIG. 5B depicts a game proceeding screen 510 which is displayed when the proceeding of the game is requested at the home screen 500 depicted in FIG. 5A. The game proceeding screen 510 is displayed on the basis of screen display data for game proceeding received from the server 3.

In the game proceeding screen 510, the progress of the game (for example, occurrence of an event, and the like) is displayed. In this screen, as an example of an event, it is displayed that an enemy character has appeared.

At the top of the screen, a text 511 indicating that an enemy character has appeared and an image 512 of the enemy character are displayed.

At the bottom of the screen, an "OK" button 513 is displayed. When the button is pressed, selection of a deck is requested to the server 3 via the device communication unit 21 by using the IDs of the player and the enemy character as parameters.

Figure 5C:
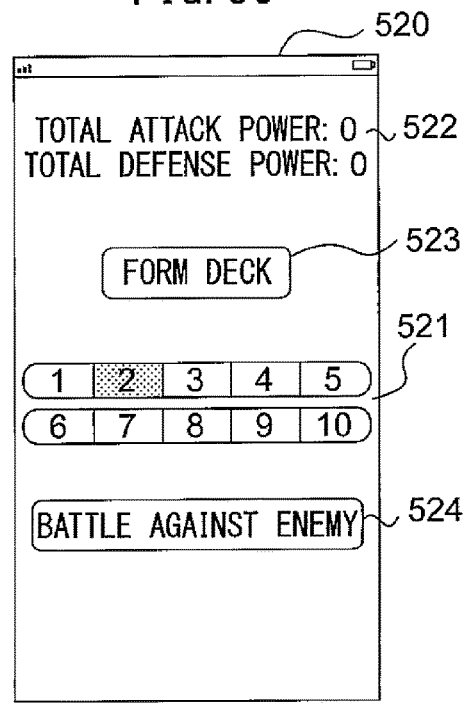

FIG. 5C depicts a deck selection screen 520 which is displayed when selection of a deck is requested at the game proceeding screen 510 depicted in FIG. 5B. The deck selection screen 520 is displayed on the basis of screen display data for deck selection received from the server 3.

In the center of the screen, plural buttons 521 are listed. When one of the buttons is pressed, a corresponding deck is selected.

At the top of the screen, in response to the selection of a deck, parameters 522 and card images of the deck are listed. If no deck has been formed, a "Form a deck" button 523 is displayed. When the button is pressed, deck editing is requested to the server 3 via the device communication unit 21 by using the IDs of the player, the enemy character and the deck as parameters.

Further, at the bottom of the screen, "Battle against enemy" button 524 is displayed. When the button is pressed, a battle against the enemy character is requested to the server 3 via the device communication unit 21 by using the IDs of the player, the enemy character and the deck as parameters.

Figure 5D:
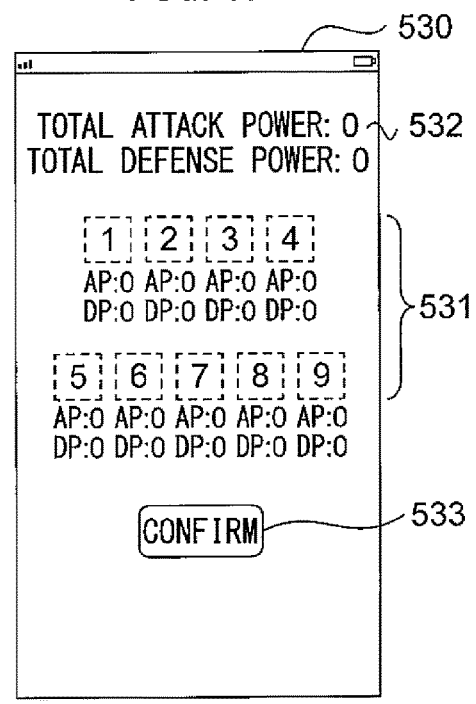

FIG. 5D depicts a deck editing screen 530 which is displayed when deck editing is requested at the deck selection screen 520 depicted in FIG. 5C. The deck editing screen 530 is displayed on the basis of screen display data for deck editing received from the server 3.

In the center of the screen, plural slots 531 are listed. When one of the slots is tapped, selection of a card to be set in the slot is requested to the server 3 via the device communication unit 21 by using the IDs of the player, the enemy character, the deck and the slot as parameters.

At the top of the screen, parameters 532 of the deck are listed.

Further, at the bottom of the screen, a "Confirm" button 533 is displayed. When the button is pressed, a deck confirmation is sent to the server 3 via the device communication unit 21 by using the IDs of the player, the enemy character and the deck as parameters.

Figure 6A:
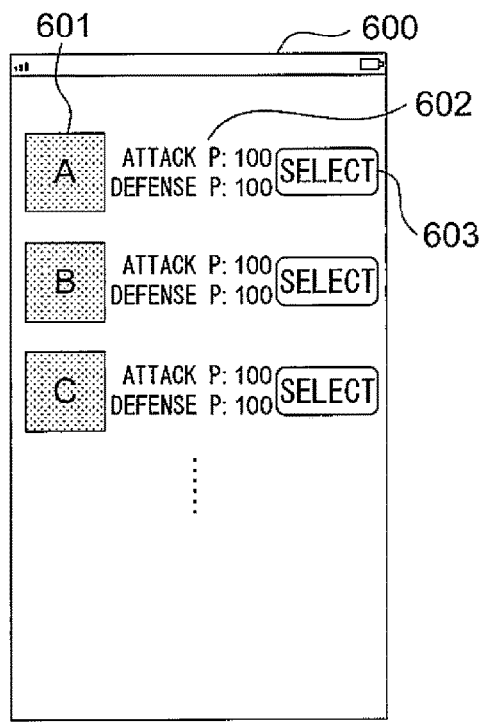
FIGS. 6A to 6D illustrate other examples of display screens of the portable device.

FIG. 6A depicts a card selection screen 600 which is displayed when selection of a card to be set in a slot$_1$ is requested at the deck editing screen 530 depicted in FIG. 5D. The card selection screen 600 is displayed on the basis of screen display data for card selection received from the server 3.

In the center of the screen, for each card, an image 601 and parameters 602 of the card and a "Select" button 603 are displayed. When the "Select" button 603 is pressed, a card confirmation is sent to the server 3 via the device communication unit 21 by using the IDs of the player, the enemy character, the deck, the slot, and the corresponding card as parameters.

Figure 6B:
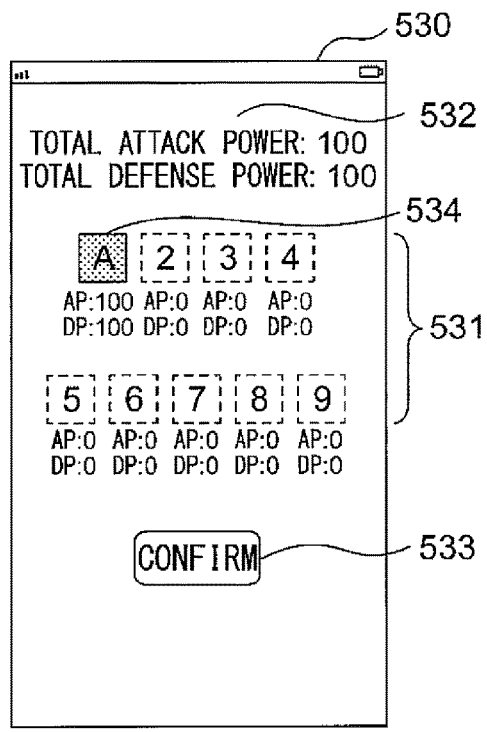

FIG. 6B depicts the deck editing screen 530 which is displayed when card A is selected at the card selection screen 600 depicted in FIG. 6A.

At the upper left part of the screen, an image 534 of the card A is displayed, which indicates that the card has been set in the slot$_1$.

At the top of the screen, the parameters 532 of the deck are listed.

Figure 6C:
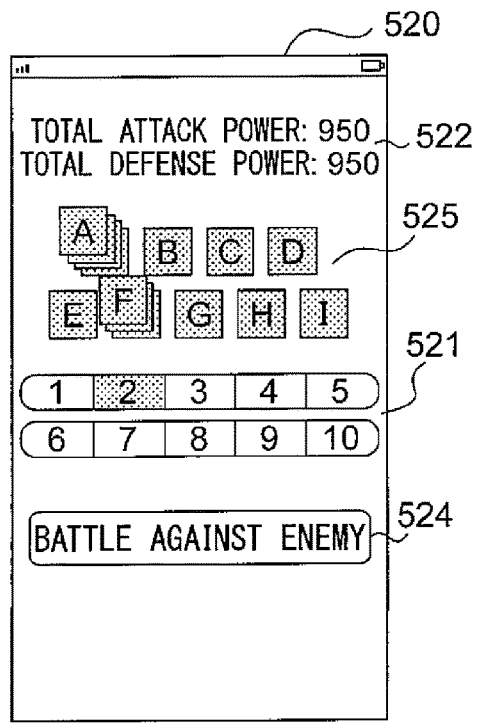

FIG. 6C depicts the deck selection screen 520 which is displayed when the edited deck is confirmed at the deck editing screen 530 depicted in FIG. 6B after cards A to I are set in slot$_1$ to slot$_9$, respectively.

At the top of the screen, the parameters 522 and card images 525 of the deck are listed. Further, for cards A and F, the images of the cards are displayed in a superimposing manner, which indicates that the parameters of the cards have been adjusted.

Card images may be displayed in a different manner which indicates that the parameters of the cards have been adjusted, without being limited to superimposing. For example, a numeral (for example, "3") indicating the number of different game contents, or the amount of increase in the parameter values may be displayed.

Alternatively, for example, if the player possesses one card and a friend possesses two cards, a numeral indicating the number of cards possessed by the player (for example, "1") and a numeral indicating the number of cards possessed by the friend (for example, "2") may be displayed.

Furthermore, if the attack power of a deck card has increased by 30%, "30% Up!!!" may be displayed. As mentioned in addition, certain thresholds may be provided for the amount of increase in parameter values, and, for example "Large Up!!! (a 70% or more increase in a parameter value)", "Middle Up!! (a 50% or more increase in a parameter value)", or "Small Up! (a 30% or more increase in a parameter value)" may be displayed. As a matter of course, a card forming a deck may be decorated and displayed depending on the amount of increase in a parameter value (for example, in a case of the Large Up, the edge of the card may be made to shine in gold, in a case of the Middle Up, the edge of the card may be made to shine in silver, and in a case of the Small Up, the edge of the card may be made to shine in copper).

Methods for adjusting parameters will be described later.

Figure 6D:
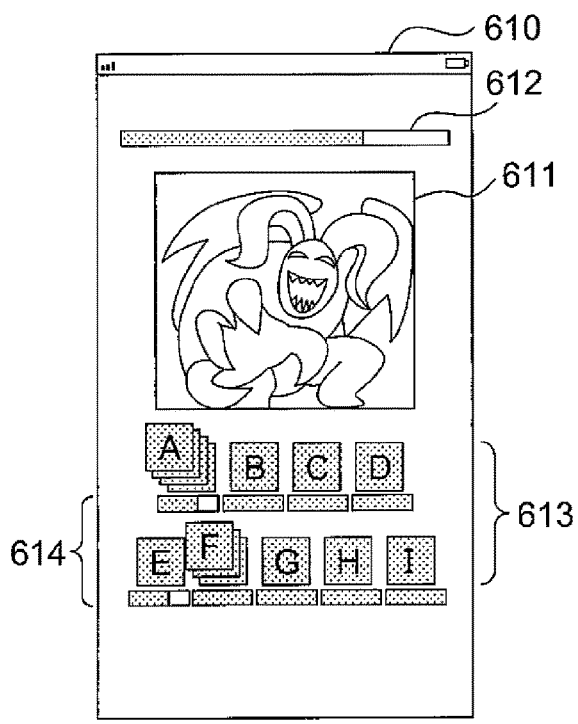

FIG. 6D depicts a battle screen 610 which is displayed when a battle against an enemy character is requested at the deck selection screen 520 depicted in FIG. 6C. The battle screen 610 is displayed on the basis of battle screen display data received from the server 3.

At the top of the screen, an image 611 and a health point gauge 612 of the enemy character are displayed, while at the bottom of the screen, images 613 and health point gauges 614 of the deck cards are displayed. Further, similarly to FIG. 6C, for cards A and F, the images of the cards are displayed in a superimposing manner, which indicates that the parameters of the cards have been adjusted.

Figure 12:
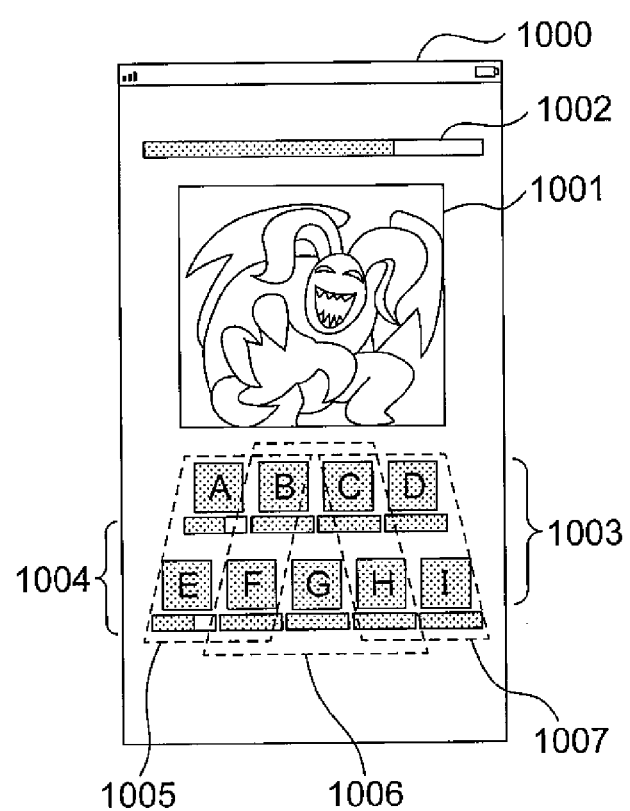
FIG. 12 illustrates an example of a battle screen of a conventional card battle game.

Proceeding of the battle is displayed in the same manner as described with reference to FIG. 12.

FIGS. 7 to 9D illustrate examples of the method for adjusting parameters.

Figure 7:
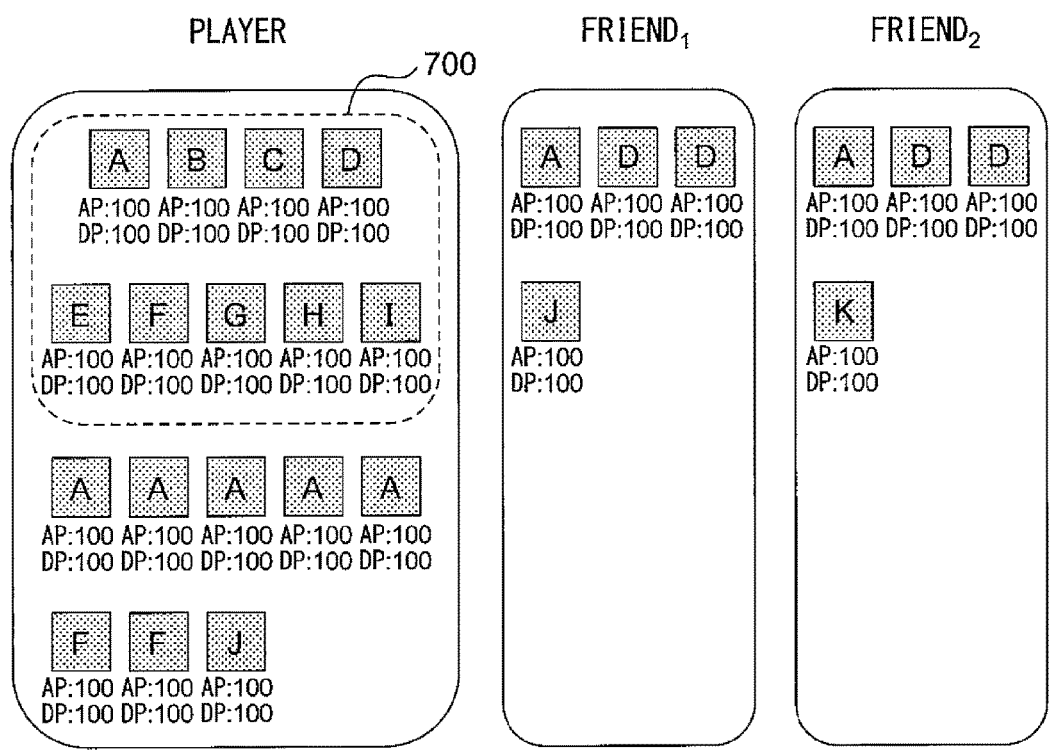
FIG. 7 illustrates an example of the method for adjusting parameters.

As illustrated in FIG. 7, it is assumed that the player possesses six cards A, one card B, one card C, one card D, one card E, three cards F, one card G, one card H, one card I, and one card J, and that a deck 700 is formed by using the cards A to I one by one. It is also assumed that the player is in a friend status with two different players (hereinafter, referred to as "friend$_1$" and "friend$_2$"). Furthermore, it is assumed that the friend$_1$ possesses one card A, two cards D, and one card J, and that the friend$_2$ possesses one card A, two cards D, and one card K.

As described above, each of the cards A to K has parameters such as attack power, defense power, and a health point. However, for the sake of simplicity, it is assumed that only attack power and defense power are to be adjusted, and that the initial values thereof are both 100.

In a first method for adjusting parameters, the parameters of a deck card are adjusted on the basis of the cards possessed by the player. More specifically, the parameters of one of the deck cards which is the same type as a card possessed by the player other than the deck cards (hereinafter, referred to as "non-deck card") are adjusted. For example, for one non-deck card (up to three cards) which is the same type as a deck card, the attack power value of the deck card is increased by 5% thereof. Similarly, for one non-deck card which is the same type as the deck card, the defense power value of the deck card is increased by 5% thereof. In other words, the adjusted attack power value and the adjusted defense power value of a deck card are calculated by the following equations:

$$p'=p\times(1+0.05\times f(n)) \quad (1)$$

$$f(n)=n \ (0\leq n\leq 3)$$

where p' denotes the adjusted attack power value or the adjusted defense power value of the deck card, p denotes the attack power value or the defense power value of the deck card, and n denotes the number of non-deck cards.

FIG. 8A illustrates a result obtained by adjusting parameters by using the first method. In relation to the deck card A, there are five non-deck cards while the upper limit is three. Therefore, on the basis of three of the five, the attack power value of the deck card A is increased by 5%×3=15% thereof, and the defense power value of the deck card A is also increased by 15% thereof. Similarly, in relation to the deck card F, since there are two non-deck cards, the attack power value of the deck card F is increased by 5%×2=10% thereof, and the defense power value of the deck card F is also increased by 10% thereof.

The method is not limited to one in which the amount of increase is based on the number of non-deck cards. For example, the amount of increase may be based on the parameter values of non-deck cards (for example, 5% of a parameter value), a weight of non-deck cards (for example, the ratio of the number of non-deck cards to the number of possessed cards of the player), or a combination thereof.

In a second method for adjusting parameters, the parameters of a deck card are adjusted on the basis of the cards possessed by the player and the positions at which the deck cards are placed. More specifically, the parameters of one of the deck cards which is the same type as a non-deck card are adjusted on the basis of the position at which the deck card is placed. For example, for one non-deck card (up to three cards) which is the same type as a deck card, the attack power value of the deck card is increased by 5% thereof. Similarly, for one non-deck card which is the same type as the deck card, the defense power value of the deck card is increased by 5% thereof. Furthermore, in a case where the number of non-deck cards is more than the upper limit, if the deck card is set on the frontline (for example, in the slot$_1$ to slot$_4$), the attack power value of the deck card is further increased by 5% thereof, and if the deck card is set as a rear guard (for example, in the slot$_5$ to slot$_9$), the defense power value of the deck card is further increased by 5% thereof. In other words, the adjusted attack power value and the adjusted defense power value of a deck card are calculated by the following equations:

$$p_{offence}'=p_{offence}\times(1+(0.05+g_{offence})\times f(n)) \quad (2A)$$

$$p_{offence}'=p_{offence}\times(1+0.05\times f(n)) \quad (2B)$$

$$p_{defense}'=p_{defense}\times(1+(0.05+g_{defense})\times f(n)) \quad (2C)$$

$$p_{defense}'=p_{defense}\times(1+0.05\times f(n)) \quad (2D)$$

$$f(n)=n \ (0\leq n\leq 3)$$

$$g_{offence}=0.05 \text{ (in a case of frontline)}$$

$$g_{defense}=0.05 \text{ (in a case of rear guard)}$$

where $p_{offence}'$ denotes the adjusted attack power value of the deck card, $p_{offence}$ denotes the attack power value of the deck card, and n denotes the number of non-deck cards. In addition, $p_{defense}'$ denotes the adjusted defense power value of the deck card, $p_{defense}$ denotes the defense power value of the deck card, and n denotes the number of non-deck cards.

FIG. 8B illustrates a result obtained by adjusting parameters by using the second method. In relation to the deck card A which is set on the frontline, there are five non-deck cards while the upper limit is three, and thus there are non-deck cards more than the upper limit. Therefore, on the basis of three of the five, the attack power value of the deck card A is increased by 10%×3=30% thereof.

In a third method for adjusting parameters, the parameters of a deck card are adjusted on the basis of the cards possessed by the player and the number of friends. More specifically, the parameters of one of the deck cards which is the same type as a non-deck card are adjusted on the basis of the number of friends. For example, the upper limit (the initial value thereof is three) of the number of non-deck cards which are referred to at the time of adjusting the parameters (hereinafter, referred to as "reference number") is increased by one for every two friends. In addition, for one non-deck card which is the same type as a deck card, the attack power value of the deck card is increased by 5% thereof. Similarly, for one non-deck card which is the same type as the deck card, the defense power value of the deck card is increased by 5% thereof. In other words, the adjusted attack power value and the adjusted defense power value of a deck card are calculated by the following equations:

$$p'=p\times(1+0.05\times f(n)) \quad (3)$$

$$f(n)=n \ (0\leq n\leq 3+g(m))$$

$$g(m)=m/2$$

where p' denotes the adjusted attack power value or the adjusted defense power value of the deck card, p denotes the attack power value or the defense power value of the deck card, n denotes the number of non-deck cards, and m denotes the number of friends.

FIG. 8C illustrates a result obtained by adjusting parameters by using the third method. As described above, since the number of friends is two, the upper limit of the reference number of non-deck cards is modified from three to four. Accordingly, the attack power value and the defense power value of the deck card A are increased by 5%×4=20% thereof, respectively, on the basis of four of the five non-deck cards.

In a fourth method for adjusting parameters, the parameters of a deck card are adjusted on the basis of the cards possessed by the player and the cards possessed by the friends. More specifically, the parameters of one of the deck cards which is the same type as a non-deck card or a card possessed by the friends are adjusted. For example, for one non-deck card or one card possessed by a friend (up to three cards) which is the same type as a deck card, the attack power value of the deck card is increased by 5% thereof. Similarly, for one non-deck card or one card possessed by a friend which is the same type as the deck card, the defense power value of the deck card is increased by 5% thereof. In other words, the adjusted attack power value and the adjusted defense power value of a deck card are calculated by the following equations:

$$p'=p\times(1+0.05\times f(n)) \quad (4)$$

$$f(n)=n+\Sigma m_i \ (0\leq n+\Sigma m_i\leq 3)$$

where p' denotes the adjusted attack power value or the adjusted defense power value of the deck card, p denotes the attack power value or the defense power value of the deck card, n denotes the number of non-deck cards, and $m_i$ denotes the number of cards possessed by the $friend_1$.

FIG. 8D illustrates a result obtained by adjusting parameters by using the fourth method. In relation to the deck card D, the $friend_1$ possesses two cards and the $friend_2$ possesses two cards while the upper limit is three. Therefore, on the basis of three of the four, the attack power value and the defense power value of the deck card D are increased by 5%×3=15% thereof, respectively.

In a fifth method for adjusting parameters, the parameters of a (first) deck card which have a predetermined positional relationship with a second deck card whose parameters have been adjusted are adjusted. For example, the (adjusted) attack power value of a first deck card is increased by 5% thereof per one second deck card which is placed adjacent to the first deck card and has been subjected to parameter adjustment. Similarly, the (adjusted) defense power value of a first deck card is increased by 5% thereof per one second deck card which is placed adjacent to the first deck card and has been subjected to parameter adjustment. In other words, the adjusted attack power value and the adjusted defense power value of a deck card are calculated by the following equations:

$$p'=p\times(1+0.05\times f(n)) \quad (5A)$$

$$p_{near}'=p\times(1+0.05) \quad (5B)$$

$$f(n)=n \ (0\leq n\leq 3)$$

where p' denotes the adjusted attack power value or the adjusted defense power value of the deck card, p denotes the attack power value or the defense power value of the deck card, and n denotes the number of deck cards whose parameters have been adjusted.

FIG. 9A illustrates a result obtained by adjusting parameters by using the fifth method. In relation to the deck card B, since it is only the deck card A that has adjusted parameters among the deck cards placed adjacent to the deck card B, the attack power value and the defense power value of the deck card B are increased by 5% thereof, respectively. Similarly, in relation to each of the deck cards E and G, since it is only the deck card F that has adjusted parameters among the deck cards placed adjacent to the deck card E or G, the attack power values and the defense power values of the deck cards E and G are increased by 5% thereof, respectively.

In a sixth method for adjusting parameters, the parameters of a (first) deck card which have a predetermined relationship with a second deck card whose parameters have been adjusted are adjusted. For example, the (adjusted) attack power value of a first deck card is increased by 5% thereof per one second deck card which is placed adjacent to the first deck card, has the same attribute as the first deck card and has been subjected to parameter adjustment. Similarly, the (adjusted) defense power value of a first deck card is increased by 5% thereof per one second deck card which is placed adjacent to the first deck card, has the same attribute as the first deck card and has been subjected to parameter adjustment. In other words, the adjusted attack power value and the adjusted defense power value of a deck card are calculated by the following equations:

$$p'=p\times(1+0.05\times f(n)) \quad (6A)$$

$$p_{attribute}'=p\times(1+0.05) \quad (6B)$$

$$f(n)=n \ (0\leq n\leq 3)$$

where p' denotes the adjusted attack power value or the adjusted defense power value of the deck card, p denotes the attack power value or the defense power value of the deck card, and n denotes the number of deck cards which have the same attribute and have been subjected to parameter adjustment.

FIG. 9B illustrates a result obtained by adjusting parameters by using the sixth method. In relation to the deck card B, since it is only the deck card A that has adjusted parameters and the same attribute (i.e., fire) as the deck card B among the deck cards placed adjacent to the deck card B, the attack power value and the defense power value of the deck card B are increased by 5% thereof, respectively. Similarly, in relation to the deck card G, since it is only the deck card F that has adjusted parameters and the same attribute (i.e., water) as the deck card G among the deck cards placed adjacent to the deck card G, the attack power value and the defense power value of the deck card G are increased by 5% thereof, respectively.

In a seventh method for adjusting parameters, the parameters of a deck card are adjusted on the basis of the relationship between the cards possessed by the player and the upper limit of the reference number thereof. More specifically, the parameters of one of the deck cards which is the same type as a non-deck card are adjusted, and the parameters of another deck card or all of the deck cards are adjusted on the basis of the relationship with the upper limit of the reference number of non-deck cards. For example, the (adjusted) attack power values of all of the deck cards are further increased by 5% thereof for each of the deck cards whose reference number of non-deck cards has reached the upper limit (three). Similarly, the (adjusted) defense power values of all of the deck cards are further increased by 5% thereof for each of the deck cards whose reference number of non-deck cards has reached the upper limit. In other words, the adjusted attack power value and the adjusted defense power value of a deck card are calculated by the following equations:

$$p'=p\times(1+0.05\times f(n))\times(1+0.05\times g(m)) \quad (7)$$

$$f(n)=n \ (0\leq n\leq 3)$$

g(m)=m (the number of deck cards whose reference number of non-deck cards has reached the upper limit)
where p' denotes the adjusted attack power value or the adjusted defense power value of the deck card, p denotes the (adjusted) attack power value or the (adjusted) defense power value of the deck card, and m denotes the number of deck cards whose reference number of non-deck cards has reached the upper limit.

FIG. 9C illustrates a result obtained by adjusting parameters by using the seventh method. The attack power value and the defense power value of the deck card A are increased by 5%×3=15% thereof, respectively. Similarly, the attack power value and the defense power value of the deck card F are increased by 5%×2=10% thereof, respectively. Furthermore, for only the deck card A among the deck cards A to I, the reference number of non-deck cards has reached the upper limit (three), and thus the (adjusted) attack power values and the (adjusted) defense power values of all of the deck cards are further increased by 5% thereof, respectively.

The target of the parameter adjustment is not limited to the deck cards, and may be, for example, a support character which appears in a battle, a figure, an avatar, an item, and the like.

Methods for adjusting parameters are not limited to the above methods, and may be a combination of two or more of the above methods, for example.

Alternatively, the parameters of a deck card may be adjusted on the basis of the cards possessed by the player and the position at which the deck card is placed. More specifically, the parameters of one of the deck cards which is the same type as a non-deck card may be adjusted on the basis of the position at which the deck card is placed. For example, the attack power value of a deck card in a slot which is not attacked often and thus tends to attack often (for example, $slot_1$, $slot_4$, $slot_5$, $slot_7$, and $slot_9$) is increased by 10% per one non-deck card of the same type (up to three cards). On the other hand, the defense power value of a deck card in a slot which is often attacked (for example, $slot_2$, $slot_3$, $slot_6$, and $slot_8$) is increased by 10% per one non-deck card of the same type (up to three cards). In other words, the adjusted attack power value and the adjusted defense power value of a deck card are calculated by the following equations:

$$p_{offence}' = p_{offence} \times (1+(0.05+g_{offence}) \times f(n)) \quad (8A)$$

$$p_{offence}' = p_{offence} \quad (8B)$$

$$p_{defense}' = p_{defense} \quad (8C)$$

$$p_{defense}' = p_{defense} \times (1+(0.05+g_{defense}) \times f(n)) \quad (8D)$$

$$f(n)=n \quad (0 \leq n \leq 3)$$

$$g_{offence}=0.05 \text{ (in a case of frontline)}$$

$$g_{defense}=0.05 \text{ (in a case of rear guard)}$$

where $p_{offence}'$ denotes the adjusted attack power value of the deck card, $p_{offence}$ denotes the attack power value of the deck card, and n denotes the number of non-deck cards. In addition, $p_{defense}'$ denotes the adjusted defense power value of the deck card, $p_{defense}$ denotes the defense power value of the deck card, and n denotes the number of non-deck cards.

FIG. 9D illustrates a result obtained by adjusting parameters by using such an adjusting method. In relation to the deck card A in the $slot_1$ which is not attacked often, there are five non-deck cards while the upper limit is three. Therefore, on the basis of three of the five, the attack power value of the deck card A is increased by 10%×3=30% thereof. Similarly, in relation to the deck card F in the $slot_6$ which is often attacked, since there are two non-deck cards, the defense power value of the deck card F is increased by 10%×2=20% thereof.

To implement the above-illustrated functions, the server processing unit 33 includes a control unit 331, a game proceeding unit 332, and a parameter adjusting unit 333. Each of the units is a functional module implemented by a program to be executed by the processor included in the server processing unit 33. Alternatively, each of the units may be provided as a firmware on the server 3.

In the following, processing by the control unit 331 will be described.

The control unit 331 controls the initiation and the progress of the game, and instructs the game proceeding unit 332 and the like to execute processing, as appropriate.

The control unit 331 interprets, when receiving a game initiation request from the portable device 2 via the server communication unit 31, the received game initiation request to specify the ID and password of the player. Then, the control unit 331 instructs a player authentication unit (not illustrated) to execute corresponding processing, by using the specified ID and password of the player as parameters.

When the player authentication unit (not illustrated) has authenticated the player, the control unit 331 creates home screen display data.

In other words, the control unit 331 creates home screen display data for displaying a button for receiving an instruction to make the game proceed and the like in a predetermined layout.

The control unit 331 sends the created home screen display data to the portable device 2 via the server communication unit 31.

The control unit 331 instructs, when receiving a game proceeding request or the like from the portable device 2 via the server communication unit 31, the game proceeding unit 332 to execute processing, by using the received game proceeding request or the like as a parameter.

The control unit 331 sends screen display data for game proceeding and the like which has been returned by the game proceeding unit 332, to the portable device 2 via the server communication unit 31.

In the following, processing by the game proceeding unit 332 will be described.

The game proceeding unit 332 controls the progress of the game, and instructs the parameter adjusting unit 333 and the like to execute processing, as appropriate.

When a game proceeding request has been provided as a parameter, the game proceeding unit 332 determines or not the game proceeding unit 332 makes an enemy character appear on the basis of a predetermined criterion (for example, with a predetermined probability by using a pseudo-random number generated using current time or the like as a seed). When the game proceeding unit 332 makes an enemy character appear, the game proceeding unit 332 creates screen display data for game proceeding which is for indicating that an enemy character has appeared.

In other words, the game proceeding unit 332 interprets the provided game proceeding request to specify the ID of the player. In addition, the game proceeding unit 332 refers to the enemy character table stored in the server storage unit 32 by using the ID of the enemy character which is made to appear as a key, and extracts the file name of image data of the corresponding enemy character. Then, the game proceeding unit 332 creates screen display data for game proceeding which includes the specified ID of the player and the ID of the enemy character which is made to appear, and which is for displaying the image corresponding to the extracted file name, a button for receiving an instruction to select a deck, and the like, in a predetermined layout.

On the other hand, when the game proceeding unit 332 does not make an enemy character appear, the game proceeding unit 332 executes different processing, and creates screen display data for game proceeding for displaying the result thereof.

When a deck selection request has been provided as a parameter, the game proceeding unit 332 creates screen display data for deck selection.

In other words, the game proceeding unit 332 interprets the provided deck selection request to specify the IDs of the player and the enemy character. In addition, the game proceeding unit 332 refers to the player table stored in the server storage unit 32 by using the specified ID of the player as a key, and extracts the IDs of the deck cards for each deck of the corresponding player. Moreover, the game proceeding unit 332 refers to the card table stored in the server storage unit 32 by using the extracted IDs of the deck card as a key, and extracts the type IDs and the adjusted parameters for the corresponding cards. Furthermore, the game proceeding unit 332 refers to the card-type table stored in the server storage unit 32 by using the extracted type IDs as a key, and extracts the file names of image data of the corresponding types. Then, the game proceeding unit 332 creates screen display data for deck selection which includes the specified IDs of the player and the enemy character and the extracted ID of each deck, and which is for displaying a button for receiving an instruction to select a deck, a button for receiving an instruction of a battle, and, for each deck, the extracted adjusted parameters, the images corresponding to the file names or a button for receiving an instruction to edit a deck, and the like, in a predetermined layout.

When a deck editing request has been provided as a parameter, the game proceeding unit 332 creates screen display data for deck editing.

In other words, the game proceeding unit 332 interprets the provided deck editing request to specify the IDs of the player, the enemy character and the deck. In addition, the game proceeding unit 332 refers to the player table stored in the server storage unit 32 by using the specified IDs of the player and the deck as a key, and extracts the IDs of the deck cards of the corresponding deck. Moreover, the game proceeding unit 332 refers to the card table stored in the server storage unit 32 by using the extracted IDs of the deck cards as a key, and extracts the type IDs of the corresponding cards. Furthermore, the game proceeding unit 332 refers to the card-type table stored in the server storage unit 32 by using the extracted type IDs as a key, and extracts the file names of image data and the parameters for the corresponding types. Then, the game proceeding unit 332 creates screen display data for deck editing which includes the specified IDs of the player, the enemy character and the deck, and which is for displaying the extracted parameters, the images corresponding to the file names, or an area which can be tapped for receiving an instruction of card selection, a button for receiving a deck confirmation, and the like, in a predetermined layout.

When a card selection request has been provided as a parameter, the game proceeding unit 332 creates screen display data for card selection.

In other words, the game proceeding unit 332 interprets the provided card selection request to specify the IDs of the player, the enemy character, the deck, and the slot. In addition, the game proceeding unit 332 refers to the player table stored in the server storage unit 32 by using the specified ID of the player as a key, and extracts the IDs of the possessed cards and the IDs of the deck cards of each deck for the corresponding player. The game proceeding unit 332 also specifies, from the extracted IDs of the possessed cards, the IDs other than the extracted IDs of the deck cards. Moreover, the game proceeding unit 332 refers to the card table stored in the server storage unit 32 by using the specified IDs of the possessed cards as a key, and extracts the type IDs of the corresponding cards. Furthermore, the game proceeding unit 332 refers to the card-type table stored in the server storage unit 32 by using the extracted type IDs as a key, and extracts the file names of image data and the parameters for the corresponding types. Then, the game proceeding unit 332 creates screen display data for card selection which includes the specified IDs of the player, the enemy character, the deck and the slot and the specified IDs of the possessed cards, and which is for displaying the extracted parameters, the images corresponding to the file names, a button for receiving a card confirmation, and the like, in a predetermined layout.

When a card confirmation has been provided as a parameter, the game proceeding unit 332 stores the IDs of the specified cards in the server storage unit 32.

In other words, the game proceeding unit 332 interprets the provided card confirmation to specify the IDs of the player, the enemy character, the deck, the slot, and the cards. Then, the game proceeding unit 332 refers to the player table stored in the server storage unit 32 by using the specified IDs of the player, the deck and the slot as a key, and stores the IDs of the specified cards as the IDs of the deck cards of the corresponding player.

Then, the game proceeding unit 332 creates screen display data for deck editing.

When a deck confirmation has been provided as a parameter, the game proceeding unit 332 interprets the provided deck confirmation to specify the IDs of the player, the enemy character and the deck. In addition, the game proceeding unit 332 instructs the parameter adjusting unit 333 to execute processing, by using the specified IDs of the player and the deck as parameters. Then, the game proceeding unit 332 creates screen display data for deck selection.

When a battle request has been provided as a parameter, the game proceeding unit 332 executes battle processing.

In other words, the game proceeding unit 332 interprets the provided battle request to specify the IDs of the player, the enemy character and the deck.

The game proceeding unit 332 refers to the player table stored in the server storage unit 32 by using the specified ID of the player and the deck as a key, and extracts the IDs of the deck cards of the corresponding player. In addition, the game proceeding unit 332 refers to the card table stored in the server storage unit 32 by using the extracted IDs of the deck cards as a key, and extracts the type IDs and the adjusted parameters of the corresponding cards. Furthermore, the game proceeding unit 332 refers to the card-type table stored in the server storage unit 32 by using the extracted type IDs as a key, and extracts the parameters of the corresponding types.

Similarly, the game proceeding unit 332 refers to the enemy character table stored in the server storage unit 32 by using the specified ID of the enemy character as a key, and extracts the parameters of the corresponding enemy character.

Then, the game proceeding unit 332 executes the battle processing on the basis of the extracted parameters, i.e., the adjusted parameters and the parameters of the types of the deck cards, and the parameters of the enemy character. For example, for each of the deck cards, the game proceeding unit 332 reduces the health point value of the enemy character on the basis of the adjusted attack power value of the deck card and the defense power value of the enemy character. Similarly, for each of (a part of) the deck cards, the game proceeding unit 332 reduces the health point value of the deck card on the basis of the attack power value of the enemy character and the adjusted defense power value of the deck card. The game proceeding unit 332 repeats this processing until the time when the health point value of the enemy character has fallen to 0 or when the health point value of each deck card has fallen to 0.

Then, the game proceeding unit 332 creates battle screen display data for displaying the progress of the battle processing.

In other words, the game proceeding unit 332 refers to the card-type table stored in the server storage unit 32 by using the extracted type IDs as a key, and extracts the file names of image data of the corresponding types. Similarly, the game proceeding unit 332 refers to the enemy character table stored in the server storage unit 32 by using the specified ID of the enemy character as a key, and extracts the file name of image data of the corresponding enemy character. Then, the game proceeding unit 332 creates battle screen display data which includes the specified IDs of the player and the enemy character, and which is for displaying the extracted parameters, the adjusted parameters, the images corresponding to the file names, and the like, in a predetermined layout.

When a different request has been provided as a parameter, the game proceeding unit 332 executes different processing corresponding to the request, and creates screen display data for game proceeding for displaying the result thereof.

The game proceeding unit 332 returns the created screen display data for game proceeding and the like to the control unit 331, and then terminates the processing.

In the following, the processing by the parameter adjusting unit 333 will be described.

The parameter adjusting unit 333 adjusts the parameters of the deck cards on the basis of the relationship between the deck cards, the cards possessed by the player and the cards possessed by a different player.

For the sake of simplicity, the processing for adjusting parameters will be described by taking the above first method as an example.

The parameter adjusting unit 333 specifies the deck cards.

In other words, the parameter adjusting unit 333 refers to the player table stored in the server storage unit 32 by using, as a key, the IDs of the player and the deck which are provided as parameters, and extracts the IDs of the deck cards of the corresponding player.

The parameter adjusting unit 333 specifies the non-deck cards.

In other words, the parameter adjusting unit 333 refers to the player table stored in the server storage unit 32 by using, as a key, the ID of the player which are provided as a parameter, and extracts the IDs of the possessed card of the corresponding player. Then, the parameter adjusting unit 333 specifies, of the extracted IDs of the possessed cards, the IDs other than the extracted IDs of the deck cards.

The parameter adjusting unit 333 specifies a deck card whose parameters are to be adjusted, from the specified deck cards.

In other words, the parameter adjusting unit 333 refers to the card table stored in the server storage unit 32 by using the extracted IDs of the deck cards as a key, and extracts the type IDs of the corresponding cards. Similarly, the parameter adjusting unit 333 refers to the card table stored in the server storage unit 32 by using the specified IDs of the possessed cards as a key, and extracts the type IDs of the corresponding cards. Then, the parameter adjusting unit 333 specifies, of the extracted IDs of the deck cards, a deck card whose type ID coincides with the type IDs of the specified possessed cards. In addition, the parameter adjusting unit 333 counts the number of possessed cards whose type ID coincides with that of the deck card.

The parameter adjusting unit 333 adjusts the parameters of the specified deck cards.

In other words, the parameter adjusting unit 333 refers to the card table stored in the server storage unit 32 by using the specified ID of the deck card as a key, and extracts the type IDs of the corresponding cards. In addition, the parameter adjusting unit 333 refers to the card-type table stored in the server storage unit 32 by using the extracted type ID as a key, and extracts the parameters of the corresponding types. Then, the parameter adjusting unit 333 adjusts the extracted parameters on the basis of the counted number.

The parameter adjusting unit 333 stores the adjusted parameters in the server storage unit 32.

In other words, the parameter adjusting unit 333 refers to the card table stored in the server storage unit 32 by using the specified IDs of the deck cards as a key, and stores the adjusted parameters as the adjusted parameters of the corresponding cards.

Then, the parameter adjusting unit 333 terminates the processing.

Figure 10:
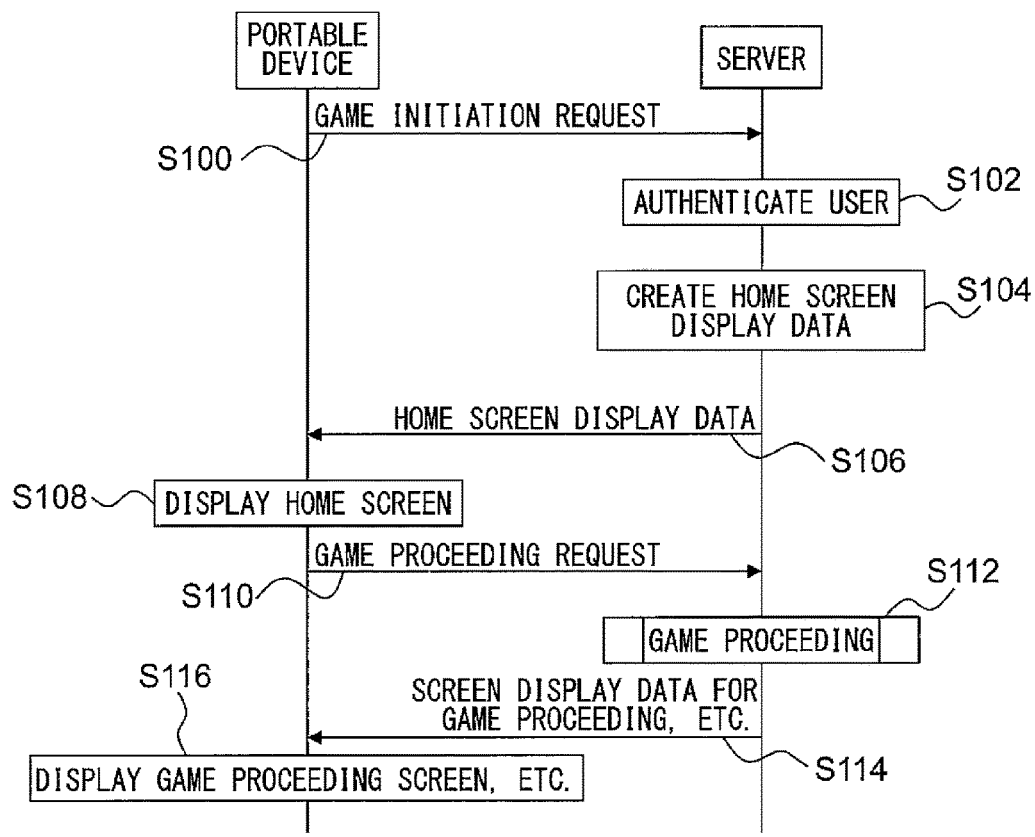
FIG. 10 illustrates an example of an operation sequence of the game system.

FIG. 10 illustrates an example of an operation sequence of the game system 1. The operation sequence to be illustrated below is executed mainly by the device processing unit 25 and the server processing unit 33 on the basis of programs previously stored in the device storage unit 22 and the server storage unit 32, in cooperation with each of the units in the portable device 2 and the server 3.

The player instructs the device processing unit 25 to execute a program for retrieving and displaying display data relating to the progress of the game via the operation unit 23. The device processing unit 25 initiates processing on the basis of this program. In other words, when the player has input a player ID and a password via the operation unit 23, the browsing executing unit 251 to be implemented by the program sends a game initiation request including the input player ID and password to the server 3 via the device communication unit 21 (Step S100).

The control unit 331 interprets, when receiving a game initiation request from the portable device 2 via the server communication unit 31, the received game initiation request, to specify the ID and password of the player. The control unit 331 instructs the player authentication unit (not illustrated) to execute processing, by using the specified ID and password as parameters of the player (Step S102).

When the player authentication unit (not illustrated) has authenticated the player, the control unit 331 creates home screen display data (Step S104).

The control unit 331 sends the created home screen display data to the portable device 2 via the server communication unit 31 (Step S106).

The browsing executing unit 251 creates, when receiving the home screen display data from the server 3 via the device communication unit 21, drawing data on the basis of the received home screen display data. Moreover, the browsing executing unit 251 outputs the created drawing data to the display unit 24 to display the home screen 500 thereon (Step S108).

The browsing executing unit 251 sends, when being instructed on the home screen 500 to make the game proceed by the player via the operation unit 23, a game proceeding request including the player ID in the received home screen display data, to the server 3 via the device communication unit 21 (Step S110).

The control unit 331 instructs, when receiving a game proceeding request and the like from the portable device 2 via the server communication unit 31, the game proceeding unit 332 to execute processing, by using the received game proceeding request and the like as a parameter (Step S112).

Figure 11A:
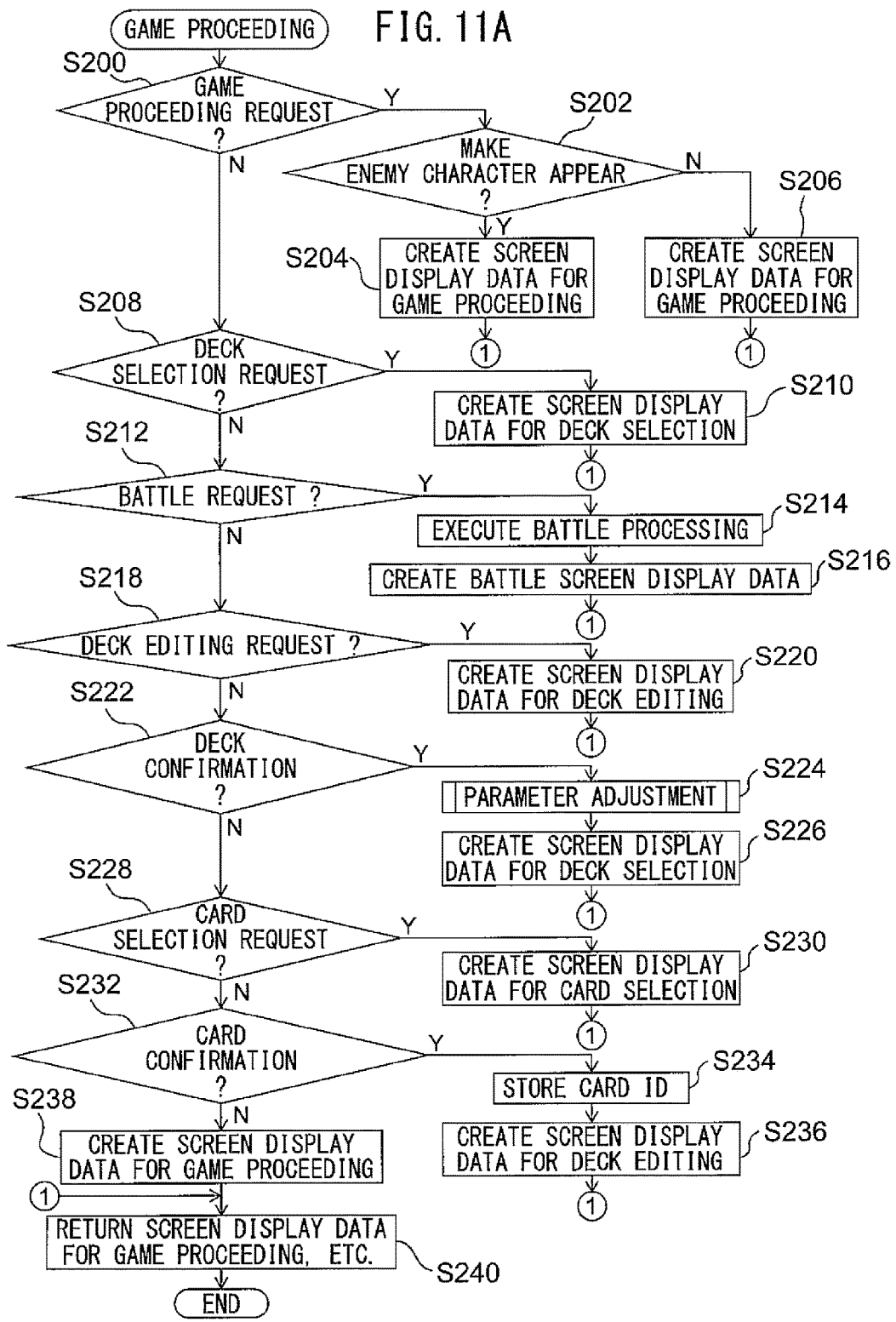
FIGS. 11A and 11B illustrate examples of the operation flows of the server.

FIG. 11A illustrates an example of the operation flow of the game proceeding unit 332.

When a game proceeding request has been provided as a parameter (Yes in Step S200), the game proceeding unit 332 determines whether or not the game proceeding unit 332 makes an enemy character appear on the basis of a predetermined criterion (Step S202).

When the game proceeding unit 332 makes an enemy character appear (Yes in Step S202), the game proceeding unit 332 creates screen display data for game proceeding which is for indicating that an enemy character has appeared (Step S204).

On the other hand, when the game proceeding unit 332 does not make an enemy character appear (No in Step S202), the game proceeding unit 332 executes different processing, and creates screen display data for game proceeding for displaying the result thereof (Step S206).

When a deck selection request has been provided as a parameter (Yes in Step S208), the game proceeding unit 332 creates screen display data for deck selection (Step S210).

When a battle request has been provided as a parameter (Yes in Step S212), the game proceeding unit 332 executes battle processing (Step S214).

The game proceeding unit 332 creates battle screen display data for displaying the progress of the battle processing (Step S216).

When a deck editing request has been provided as a parameter (Yes in Step S218), the game proceeding unit 332 creates screen display data for deck editing (Step S220).

When a deck confirmation has been provided as a parameter (Yes in Step S222), the game proceeding unit 332 interprets the provided deck confirmation to specify the IDs of the player, the enemy character and the deck. In addition, the game proceeding unit 332 instructs the parameter adjusting unit 333 to execute processing, by using the specified IDs of the player and the deck as parameters (Step S224).

Figure 11B:
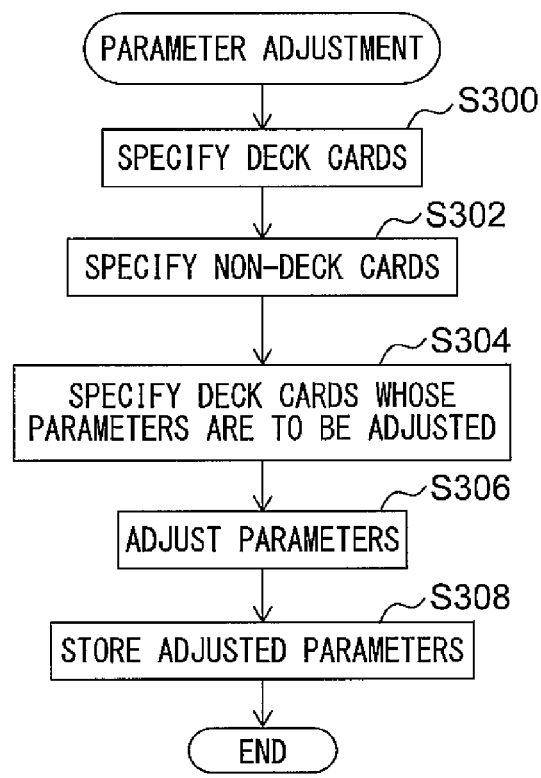

FIG. 11B illustrates an example of the operation flow of the parameter adjusting unit 333.

The parameter adjusting unit 333 specifies the deck cards (Step S300).

The parameter adjusting unit 333 specifies the non-deck cards (Step S302).

The parameter adjusting unit 333 specifies the deck cards whose parameters are to be adjusted, of the specified deck cards (Step S304).

The parameter adjusting unit 333 adjusts the parameters of the specified deck cards (Step S306).

The parameter adjusting unit 333 stores the adjusted parameters in the server storage unit 32 (Step S308). Then, the parameter adjusting unit 333 terminates the processing.

Return to FIG. 11A. The game proceeding unit 332 creates screen display data for deck selection (Step S226).

When a card selection request has been provided as a parameter (Yes in Step S228), the game proceeding unit 332 creates screen display data for card selection (Step S230).

When a card confirmation has been provided as a parameter (Yes in Step S232), the game proceeding unit 332 stores the IDs of the specified cards in the server storage unit 32 (Step S234).

The game proceeding unit 332 creates screen display data for deck editing (Step S236).

When a different request has been provided as a parameter (No in Step S232), the game proceeding unit 332 executes different processing corresponding to the request, and creates screen display data for game proceeding for displaying the result thereof (Step S238).

The game proceeding unit 332 returns the created screen display data for game proceeding and the like to the control unit 331 (Step S240), and then terminates the processing.

Return to FIG. 10. The control unit 331 sends screen display data for game proceeding or the like which has been returned by the game proceeding unit 332, to the portable device 2 via the server communication unit 31 (Step S114).

The browsing executing unit 251 creates, when receiving screen display data for game proceeding and the like from the server 3 via the device communication unit 21, drawing data on the basis of the received screen display data for game proceeding and the like. Moreover, the browsing executing unit 251 outputs the created drawing data to the display unit 24 to display the game proceeding screen 510 and the like thereon (Step S116).

The browsing executing unit 251 sends, when being instructed on the game proceeding screen 510 and the like to make the game proceed and the like by the player via the operation unit 23, a game proceeding request and the like to the server 3 via the device communication unit 21 (Step S110).

As has been described above, the parameters of the deck cards are adjusted on the basis of the possessed cards other than the deck cards, which makes it possible to cause players to effectively use possessed cards in a game, and increase the attractiveness of the game. Then, this makes it possible to maintain and increase the players' wish to continue the service, and enable the players to maintain their interests in the game.

It should be noted that the present invention is not limited to the present embodiment. For example, although the server 3 adjusts the parameters in the present embodiment, the portable device 2 may adjust the parameters. In this case, for example, it is only necessary for the server 3 to send, to the portable device 2, all of the information (for example, IDs of deck cards, non-deck cards, cards possessed by the friends, and the like) which is required in the parameter adjustment, and make the portable device 2 adjust the parameters.

A computer program for causing a computer to execute the respective functions of the device processing unit 25 and the server processing unit 33 may be provided in a form recorded on a non-transitory computer-readable recording medium such as a semiconductor recording medium, a magnetic recording medium and an optical recording medium, and may be installed on the device storage unit 22 and the server storage unit 32 from the recording medium by using a known set-up program, and the like.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A computer for executing progress of a game by using a game content having a parameter value, the computer comprising:
   a memory configured to store a plurality of game contents associated with a player and a plurality of first game contents selected from the plurality of game contents associated with the player according to an instruction from the player; and circuitry configured to
- count, for each of the first game contents, a number of the game contents in the plurality of game contents whose type matches each type of the first game contents,
- modify, for at least one of the first game contents, the parameter value of each of the first game contents based on the counted number of the game contents whose type matches each type of the first game contents,
- execute progress of the game by using the plurality of first game contents, and
- control a display to display, for each of the first game contents, an image indicating the counted number of each of the first game contents, wherein the number of the game contents which are counted at the time of modifying has a predetermined value, and the circuitry is configured to modify the predetermined value on the basis of prescribed conditions.

2. The computer according to claim 1, wherein the circuitry is configured to increase, for each of the first game contents, the parameter value of each of the first game contents based on the counted number of the game contents whose type matches each type of the first game contents, when the counted number of the game contents reaches a predetermined value.

3. The computer according to claim 1, wherein the circuitry is configured to output display data corresponding to the parameter value of each of the first game contents based on the counted number of the game contents whose type matches each type of the first game contents.

4. The computer according to claim 1, wherein the circuitry is configured to control the display to display, for each of the first game contents, an image based on display data corresponding to a predetermined value.

5. The computer according to claim 1, wherein
the first game content forms a deck used in an event which occurs in the game, and
the circuitry is configured to output display data for displaying a deck editing screen for prompting the player to select the first game contents for forming the deck.

6. The computer according to claim 5, wherein
the circuitry is configured to:
- output display data for displaying a deck selection screen for prompting the player to select a deck to be edited from a plurality of decks; and
- when the deck is selected at the deck selection screen, output display data for displaying the deck editing screen relating to the selected deck.

7. The computer according to claim 1, wherein the circuitry is configured to output display data for displaying the parameter value of each of the first game contents before the number of the game contents is counted.

8. The computer according to claim 1, wherein
the parameter value includes attack power value,
the memory is configured to store, for each player, identification information and name of the player, the plurality of game contents, and the plurality of first game contents, and stores for each of the first game contents, identification information and a type of the first game contents, modified attack power value, rarity value, and health point value, and
the circuitry is configured to extract the plurality of first game contents of the player from the memory, extract the modified attack power value and health point value of the extracted first game contents, and execute progress of the game by using the extracted first game contents, the extracted modified attack power value and extracted health point value.

9. The computer according to claim 8, wherein
the memory is configured to store identification information, name, attack power value, and health point value of an enemy character, and
the circuitry is configured to execute progress of the game by reducing the health point value of the enemy character based on the modified attack power value of the first game content, and by reducing the point value of the first game content based on the attack power value of the enemy character.

10. The computer according to claim 1, wherein the circuitry is configured to:
- extract identification information of each of the first game contents and identification information of each of the plurality of game contents,
- extract a type of each of the extracted first game contents based on the extracted identification information of each of the first game contents,
- extract a type of each of the extracted game contents based on the extracted identification information of each of the game contents,
- count, for each of the extracted first game contents, a number of the extracted game contents whose extracted type matches each extracted type of the first game contents, and
- modify, for each of the extracted first game contents, the parameter value of each of the extracted first game contents based on the counted number of the extracted game contents whose type matches each type of the extracted first game contents.

11. The computer according to claim 1, wherein the predetermined value is an upper limit value.

12. A non-transitory computer-readable recording medium having recorded thereon a program for a computer including a memory configured to store a plurality of game contents associated with a player and a plurality of first game contents selected from the plurality of game contents associated with the player according to an instruction from the player, the computer executing progress of a game by using a game content having a parameter value, the program causing the computer to execute a process, the process comprising:
- counting, for each of the first game contents, a number of the game contents in the plurality of game contents whose type matches each type of the first game contents;
- modifying, for at least one of the first game contents, the parameter value of each of the first game contents based on the counted number of the game contents whose type matches each type of the first game contents;
- executing progress of the game by using the plurality of first game contents; and
- controlling a display to display, for each of the first game contents, an image indicating the counted number of each of the first game contents, wherein the number of the game contents which are counted at the time of modifying has a predetermined value, and the process comprises modifying the predetermined value on the basis of prescribed conditions.

13. A method for controlling a computer for executing progress of a game by using a game content having a parameter value, the method comprising:

storing, in a memory, a plurality of game contents associated with a player and a plurality of first game contents selected from the plurality of game contents associated with the player according to an instruction from the player;

counting, using circuitry, for each of the first game contents, a number of the game contents in the plurality of game contents whose type matches each type of the first game contents;

modifying, for at least one of the first game contents, the parameter value of each of the first game contents based on the counted number of the game contents whose type matches each type of the first game contents;

executing progress of the game by using the plurality of first game contents; and controlling a display to display, for each of the first game contents, an image indicating the counted number of each of the first game contents, wherein the number of the game contents which are counted at the time of modifying has a predetermined value, and the method comprises modifying the predetermined value on the basis of prescribed conditions.

\* \* \* \* \*